W. O. TAYLOR.
TACK WEIGHING AND PACKAGING MACHINE.
APPLICATION FILED NOV. 22, 1910.

1,019,555.

Patented Mar. 5, 1912.

8 SHEETS—SHEET 1.

WITNESSES
Hamilton S. Turner
Harry L. Smith

INVENTOR
WM. O. TAYLOR
BY HIS ATTORNEY
Harry Smith

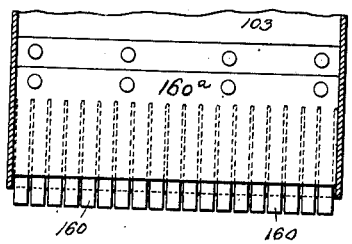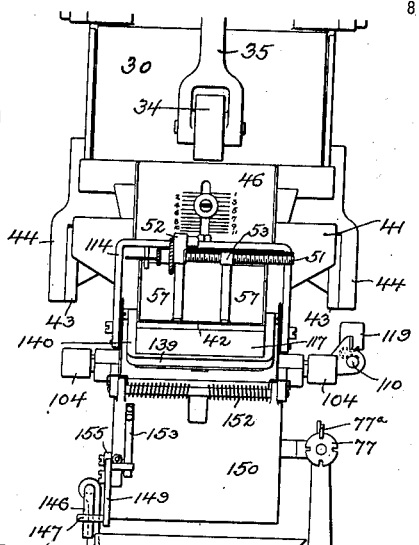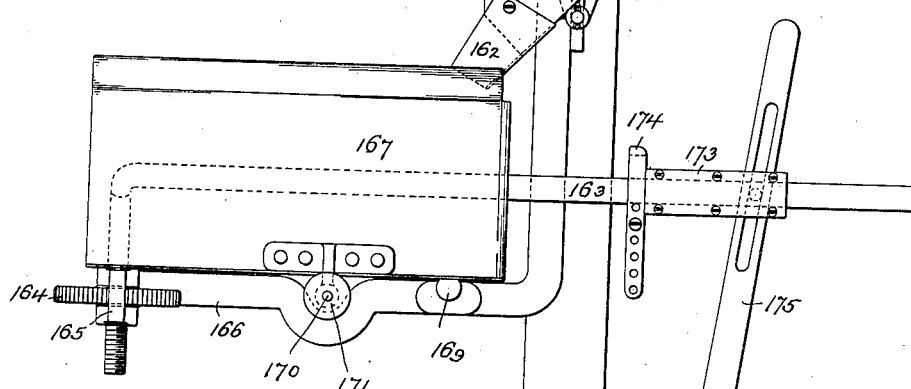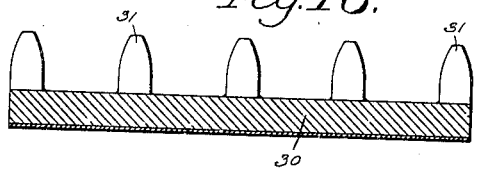

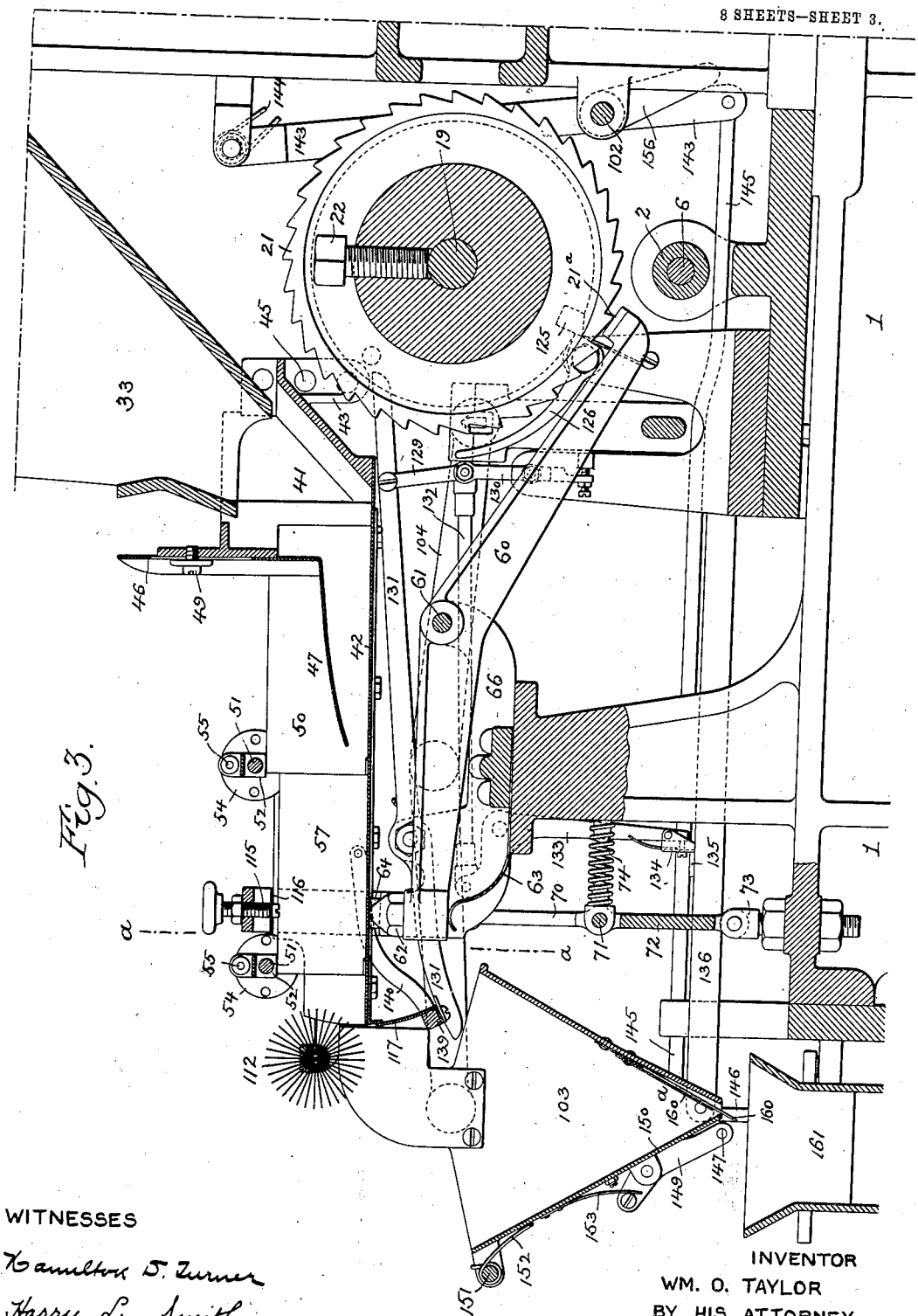

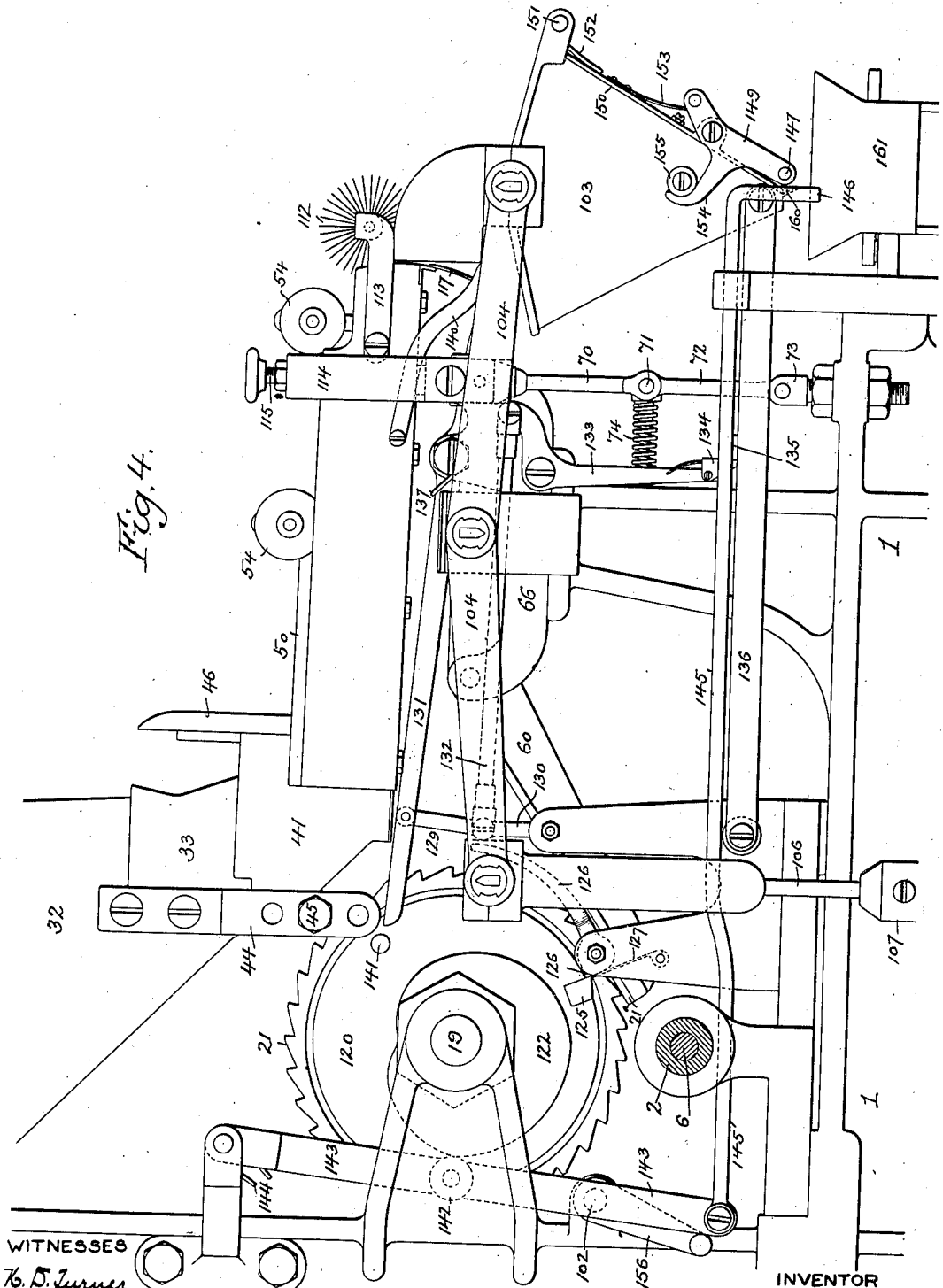

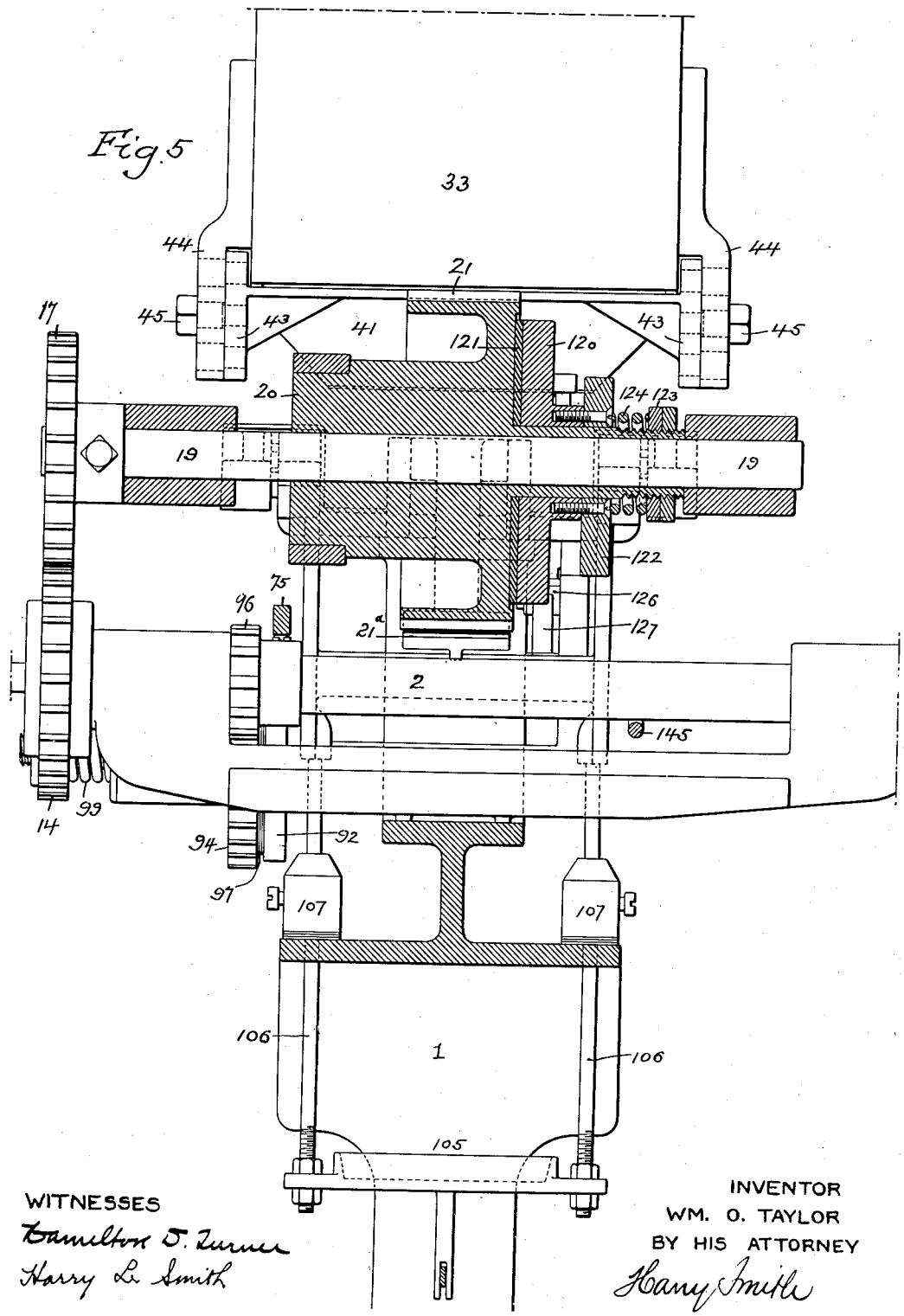

W. O. TAYLOR.
TACK WEIGHING AND PACKAGING MACHINE.
APPLICATION FILED NOV. 22, 1910.
1,019,555.
Patented Mar. 5, 1912.
8 SHEETS—SHEET 6.
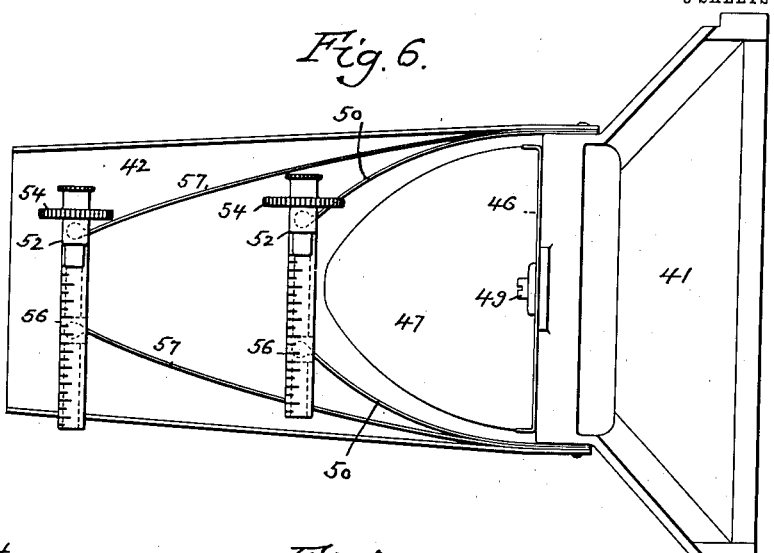
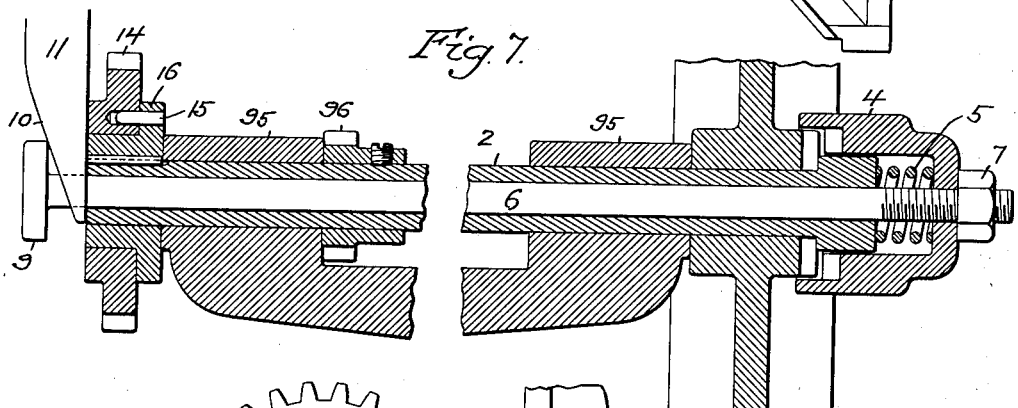
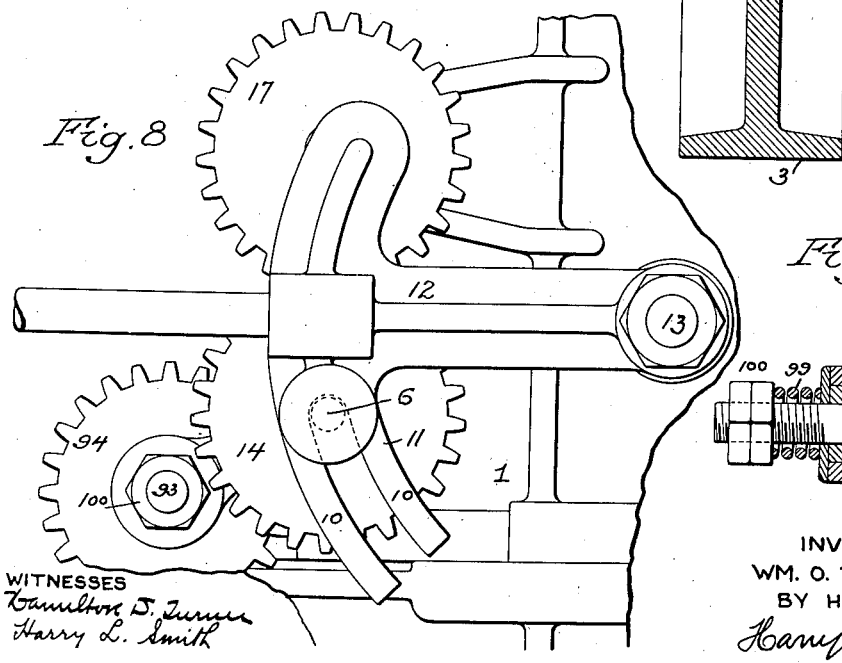
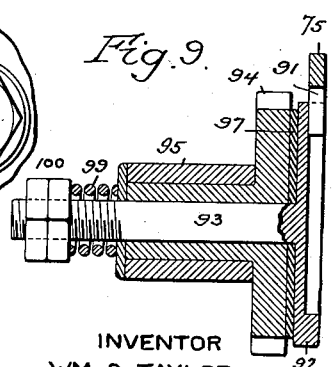
WITNESSES
Hamilton S. Turner
Harry L. Smith
INVENTOR
WM. O. TAYLOR
BY HIS ATTORNEY
Harry Smith W. O. TAYLOR.
TACK WEIGHING AND PACKAGING MACHINE.
APPLICATION FILED NOV. 22, 1910.
1,019,555.
Patented Mar. 5, 1912.
8 SHEETS—SHEET 7.
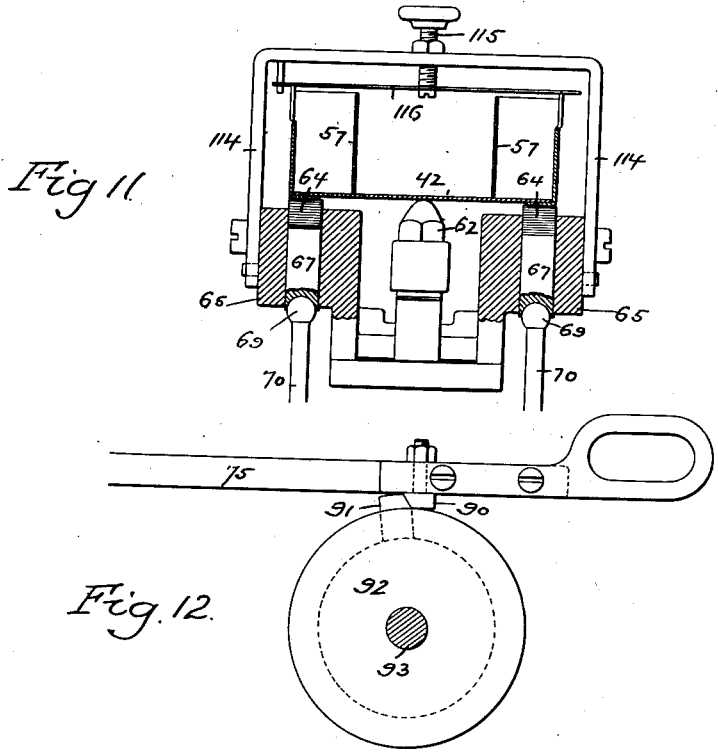
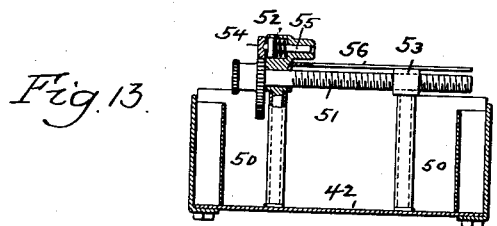
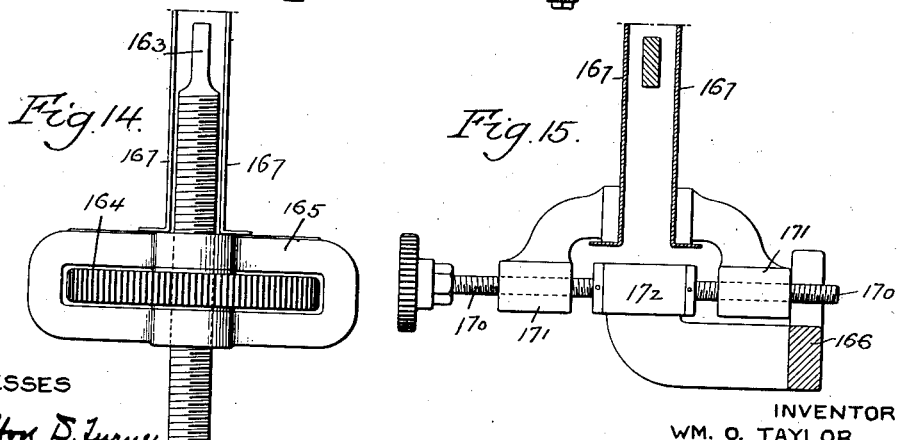
WITNESSES
Hamilton D. Turner
Harry L. Smith
INVENTOR
WM. O. TAYLOR
BY HIS ATTORNEY
Harry Smith W. O. TAYLOR.
TACK WEIGHING AND PACKAGING MACHINE.
APPLICATION FILED NOV. 22, 1910.

1,019,555.

Patented Mar. 5, 1912.
8 SHEETS—SHEET 8.

WITNESSES
Hamilton D. Turner
Elsie Fullerton

INVENTOR
WM. O. TAYLOR
BY HIS ATTORNEY
Harry Smith

UNITED STATES PATENT OFFICE.

WILLIAM O. TAYLOR, OF LIMERICK SQUARE, PENNSYLVANIA, ASSIGNOR TO TAYLOR AND COMPANY, OF LIMERICK SQUARE, PENNSYLVANIA, A FIRM.

TACK WEIGHING AND PACKAGING MACHINE.

1,019,555.  Specification of Letters Patent.  Patented Mar. 5, 1912.

Application filed November 22, 1910. Serial No. 593,695.

*To all whom it may concern:*

Be it known that I, WILLIAM O. TAYLOR, a citizen of the United States, residing at Limerick Square, Montgomery county, Pennsylvania, have invented certain Improvements in Tack Weighing and Packaging Machines, of which the following is a specification.

My invention consists of certain improvements in or modifications of the machine for weighing tacks, nails, screws, etc., (hereinafter, for convenience, referred to as tacks) for which I obtained Letters Patent of the United States No. 946,171, dated January 11, 1910, the objects of my present improvements being to simplify the construction of the machine, to render the weighing operation even more accurate than before, and to provide for the packaging of the tacks as they are weighed. These objects I attain in the manner hereinafter set forth, reference being had to the accompanying drawings, in which—

Figures 1, 10:
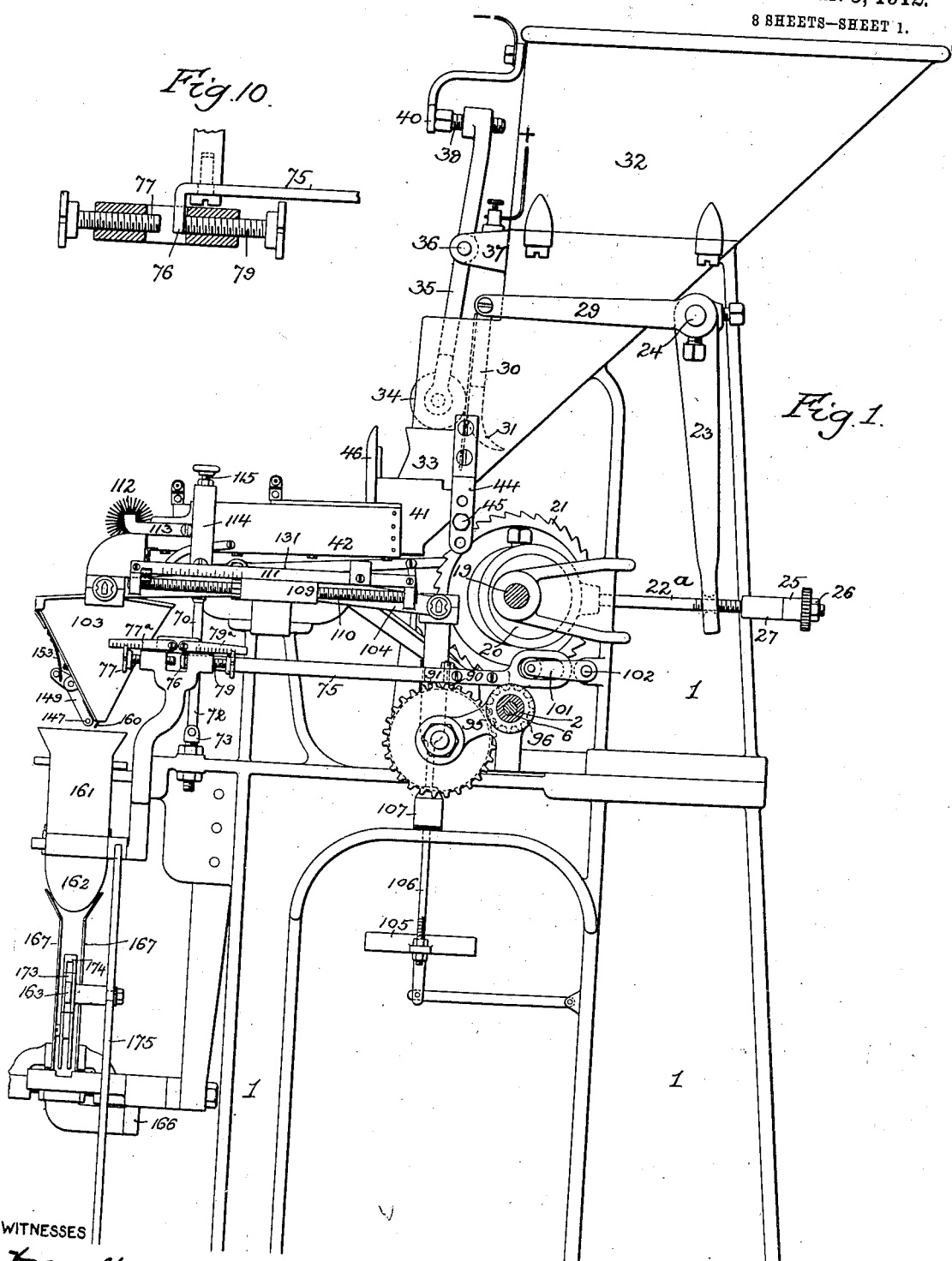
Figure 18:
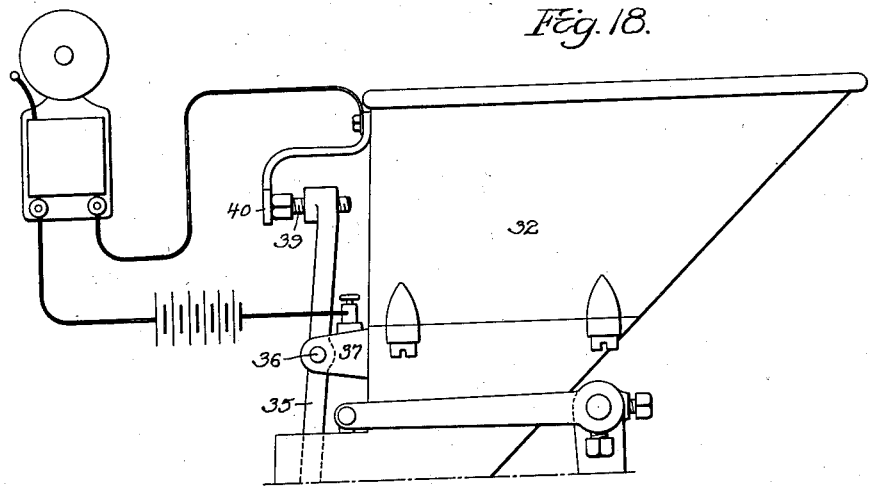
Figure 19:
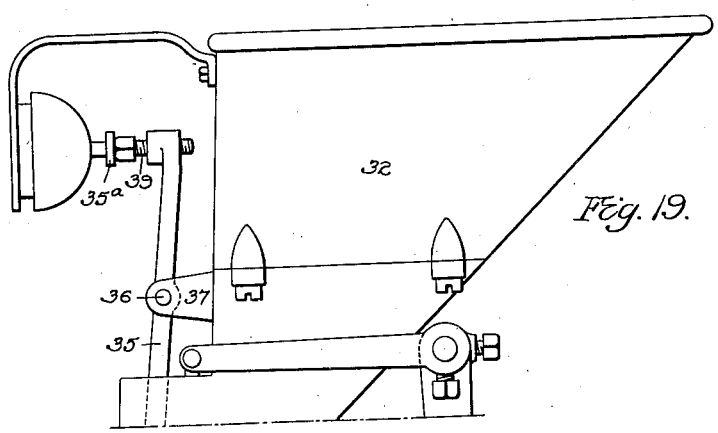
Figure 20:
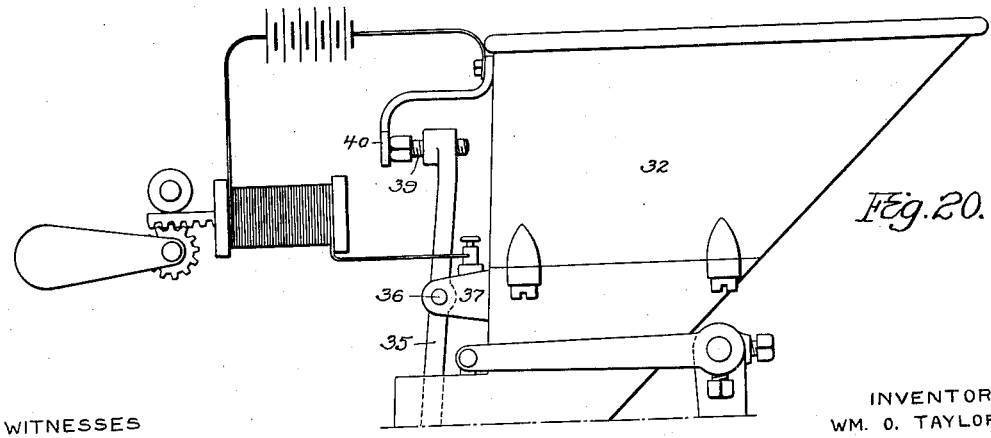

Figure 1 is a side elevation of the machine, omitting certain elements of the driving mechanism; Fig. 2 is a front view of the machine omitting the circular brush at the front of the feed trough and certain elements of the driving mechanism at the rear of the machine; Fig. 3 is a view partly in elevation and partly in longitudinal section of certain parts of the machine; Fig. 4 is a side elevation of the same parts of the machine, looking in the opposite direction from Fig. 3; Fig. 5 is a back view of certain parts of the machine, some of which are in transverse section; Fig. 6 is a top or plan view of the feeding trough and its appurtenances; Fig. 7 is a transverse section illustrating certain elements of the driving mechanism; Fig. 8 is a side elevation of parts of the same; Fig. 9 is a transverse section of certain of the parts whereby the extent of vibration of the feed trough is restricted; Fig. 10 is a plan or top view, partly in section, of certain other of said parts; Fig. 11 is a transverse section of certain elements of the machine on the line *a—a*, Fig. 3; Fig. 12 is a side elevation of some of the parts illustrated in Fig. 9; Fig. 13 is a transverse section of the devices for adjusting the lateral "choke" plates of the feed trough; Fig. 14 is an end elevation of the devices employed for adjusting the supporting bar for the tack-receiving package; Fig. 15 is a transverse section illustrating the means employed for laterally adjusting the side plates of the guide for said package; Fig. 16 is a sectional plan view of the lower portion of a segregating plate used in connection with the feed hopper, Fig. 17 is a transverse section of the lower portion of the scale pan. Fig. 18 is a view showing the electric alarm bell and connections used to indicate a failing supply of tacks in the hopper of the machine, and Figs. 19 and 20 are views illustrating modifications of said alarm device. Figs. 3 to 17, inclusive, are on a larger scale than Figs. 1 and 2.

The machine is mounted upon a standard 1 which is provided with suitable bearings for the driving shaft 2 to which power may be imparted in any desired way, this driving shaft having, in the present instance, a loose pulley 3 for receiving a driving belt. The hub of the pulley 3 has teeth for engagement with the teeth on a clutch hub 4, which is free to slide on one end of the shaft 2 and is acted upon by a coiled spring 5, whose normal tendency is to maintain the teeth of the hubs out of engagement with one another, as shown in Fig. 7.

The shaft 2 is tubular, and a rod 6 passes through said shaft, one end of said rod being threaded for the reception of a nut 7 which bears upon the outer face of the clutch hub 4, the other end of the rod having a head 9 upon which bears the beveled outer face 10 of a sector 11 which forms part of a lever 12 pivoted at 13 on the fixed structure of the machine, said sector 11 being slotted for the reception of the rod 6, as shown in Fig. 8. The inner face of the sector 11 bears against the outer face of a spur wheel 14 which is mounted upon a hub 16 keyed to the shaft 2, and is secured against rotation on said hub by means of a dowel pin 15, as shown in Fig. 7. When the lever 12 is depressed, as shown in Fig. 8, the rod 6 will be moved to the left and the toothed face of the clutch hub 4 will be caused to engage with the toothed face of the hub of the driving wheel 3 and rotating movement will be imparted to the shaft 2, but when the lever 12 is raised, as shown in Fig. 7, the spring 5 will move the toothed face of the clutch hub out of engagement with the toothed face of the wheel hub and further rotation of the shaft 2 will be arrested.

By detachably connecting the spur wheel 14 to the hub 16, the use of spur wheels of different diameters is provided for, as the desired speed of other operative parts of the machine may require. The spur wheel 14 meshes with a spur wheel 17 on a shaft 19 turning in bearings on the fixed frame of the machine, this shaft being provided with an eccentric 20 and a toothed wheel 21 which are secured to the shaft 19 by means of a set screw 22 (Fig. 3) so as to rotate continuously therewith as long as power is being applied to the driving shaft. The eccentric 20 has a strap with projecting rod 22$^a$ which passes through an opening near the lower end of an arm 23, the latter being secured to a rock shaft 24, turning in bearings near the upper end of the fixed frame of the machine, the outer end of the rod 22$^a$ being threaded for the reception of a nut 25 and lock nut 26, the nut 25 acting upon a block 27 which, on the inward throw of the eccentric, contacts with the lower end of the arm 23 and imparts movement in one direction to the shaft 24, the adjustment of the nut 25 and block 27 determining the amount of lost motion between the block and the arm 23 and consequently the extent of the movement imparted to the shaft 24. Movement of said shaft in the opposite direction is effected by the weight of the other parts connected thereto, and of the tacks which exert downward pressure upon one of said parts.

At each end of the shaft 24 is an arm 29, the forward ends of these arms being connected to the upper end of a segregating plate 30 having internally projecting hooks 31 at its lower end (see Fig. 1) this plate having vertical reciprocation across the mouth of the hopper 32 in which the tacks are deposited, said hopper having an inclined bottom which serves to feed the tacks automatically against the inner face of the plate 30. The vertical reciprocation of the plate 30 and its inwardly bent hooks therefore serves to break up the mass of tacks in the lower portion of the hopper and to feed them with some approach to regularity into a spout 33 which constitutes the lower end of the hopper.

Inward pressure upon the segregating plate 30 is effected by the normal inward movement of a roller 34, mounted so as to rotate upon the lower end of a lever 35 which is secured to a shaft 36 free to turn in brackets 37 on the front of the hopper, the upper end of said lever carrying a set screw 39 which, when the segregating plate is at the extreme of its inward movement, strikes a contact arm 40 having an insulated support on the hopper 32 and communicating with one terminal of a generator of electricity whose other terminal communicates in any desired way with the set screw 39, as for instance, by securing its binding post to the bracket 37.

As long as the hopper is charged with tacks the outward pressure of the same upon the segregating plate 30 will force the roller 34 outward and thereby hold the set screw 39 out of contact with the plate 40, and thus interrupt the electrical circuit in which a bell or other suitable alarm may be interposed as shown in Fig. 18. When, however, the supply of tacks is almost exhausted, the inward pressure of the roller 34 upon the plate 30 will exceed the outward pressure of the tacks upon the latter and the lever 35 will be permitted to move so as to bring the set screw 39 into contact with the plate 40, thereby closing the circuit and sounding the alarm so that the attendant will know that the hopper is almost empty and requires refilling.

A mechanically operated bell may, if desired, be used in place of an electrically operated one, the arm 35 when in the position shown in Fig. 1 pressing upon the device 35$^a$, Fig. 19, which starts the bell to ringing, and when in the other position removing the pressure from said device, and causing the bell to stop ringing, or a visual signal may replace the sound signal, if desired, as shown in Fig. 20.

The spout 33 discharges at its lower end into a box 41 at the head of a vibrating feed trough 42, this box having, at each side, a bracket 43 (Fig. 5) whereby it is pivoted to a bracket 44 secured to the corresponding side of the hopper, each bracket having a vertical row of openings therein, to any corresponding pair of which the pivot pin 45 may be adapted.

When the pivot pins are in the lowermost of the openings the pivotal axis of the feed trough 42 is almost in line with the bottom of said trough and the vibrating movements of the outer end of the trough will be almost vertical, but the higher the location of the pivot pins above the bottom of the trough the greater will be the forward pitch of the vibrating movement, consequently the feeding action of the trough can be materially modified by shifting the pivots 45, and that movement of the trough may thereby be effected which is best calculated to insure the proper delivery of the particular class of tacks which is being acted upon.

Secured to the front of the box 41 is a vertical plate 46, which has, at its lower end, a forwardly projecting and downwardly inclined spreader plate 47, the latter acting upon the mass of tacks emerging from the front of the box 41 and serving to spread the same laterally over the bottom of the trough 42. The plate 46 is slotted for the reception of a screw 49 whereby it is confined to the front of the box 41 and alongside of this slot is a graduated scale, such for instance as shown in Fig. 2, this scale indicating the vertical relation of the forward end of the spreader plate 47 to the bottom of the trough, such adjustment providing a space between these parts which is somewhat in excess of the length of a tack of the size which is being operated upon, whereby the plate will not obstruct the forward passage of a single layer of tacks, even if they are up-ended, but will prevent the tacks from escaping in piles or bunches. The downward pitch or inclination of the forward portion of the plate 47 is of value in effecting this result when the machine is weighing headless tacks or nails, which require to be more strongly restrained against forward movement than headed tacks.

The spreader plate 47 is within the limits of a reservoir formed at the head of the delivery trough 42 by means of elastic side wings 50 whose rear ends are secured to the sides of the trough at the head of the latter, as shown in Fig. 6. The forward ends of the wings 50 have a natural tendency to move outward but this tendency of one wing is counteracted by the like tendency of the other, and as a result of this location of the delivery throat between the wings is maintained at about the longitudinal center of the trough 42. The forward ends of the wings 50 can be drawn together so as to contract the width of the throat at the forward end of the reservoir and thereby regulate the delivery of tacks from said throat and thus, in a measure, govern the rate of delivery of the tacks from the forward end of the trough 42. In the present instance such adjustment is effected by means of a transverse screw 51 which is mounted so as to rotate in a block 52 at the forward end of one of the wings 50 and engages a nut 53 at the forward end of the opposite wing, as shown in Fig. 13, the screw having at one end a milled head 54 with spaced openings in its inner face, which openings are engaged by a spring-actuated plug 55 guided in the block 52, as shown in Fig. 13.

The block 52 carries a graduated plate 56 which indicates the width of throat presented between the forward ends of the wings 50. As neither of the wings 50 is laterally fixed at its forward end, turning of the screw 51 tends to move each of said forward ends of the wings toward or from each other to the same extent, thus always preserving the central disposition of the delivery throat between them. In advance of the reservoir found between the wings 50 is a supplemental reservoir bounded by side wings 57 mounted in the same way as the wings 50 and adjustable by mechanism similar to that employed in connection with the same, these wings 57 serving to again arrest the forward movement of the tacks and concentrate the delivery of said tacks at the central portion of the forward end of the trough, thereby aiding in producing a uniform discharge of the tacks from the trough.

Vibration of the trough 42 is effected by means of the toothed wheel 21 which acts upon a tappet 21ª at the rear end of a lever 60, the latter being pivotally mounted upon a transverse rod 61, carrying, at its forward end, a contact head 62 upon which the bottom of the trough 42 normally rests, the contact head being maintained constantly in contact with the trough by means of a spring 63, interposed beneath the lever 60, as shown in Fig. 3, the weight and downward pressure of the trough and the parts carried thereby being, however, in excess of the upward lift of the spring 63, so that there is a constant tendency to depress the head 62, and to raise the tappet 21ª at the other end of the lever 60. The trough 32 is at the top of its lift when a tooth of the wheel 21 is just about to leave the tappet 21ª, hence the amount of vibration of the trough depends upon the amount of drop from this high point which is permitted it. This is varied by the use of vertically adjustable stop blocks 64, one on each side of the lever head 62, as shown in Fig. 11.

The stop blocks 64 are preferably composed of rubber or other elastic or semi-elastic material, and these blocks are, as shown in Fig. 11, guided in tubular portions 65 of a bracket 66 secured to the main frame, each of the rubber blocks resting upon a metal block 67 and the latter in turn being supported by the rounded head 69 of the upper member 70 of a toggle whose members are pivoted together by a central pin 71 whose lower member 72 is pivoted to a vertically adjustable stud 73 on the main frame, as shown in Figs. 1 and 3. When the members of the toggle are straight, as shown in these figures, the blocks 64 are at the limit of their upward movement, and no drop or but a very slight drop of the trough from its high point is permitted, the vibration of the trough being either wholly arrested or at its minimum, and the teeth of the tappet wheel 21 either clearing or barely touching the tappet 21ª.

A coiled spring 74 acts upon the central pin 71 of the toggle so as to tend to move the same forward and thus bend the toggle and permit of the descent of the stop blocks and a corresponding increase in the drop of the trough from its high point, the tappet 21ª coming more and more under the influence of the teeth of the tappet wheel 21, and there being a corresponding increase in the extent of the vibrations of the lever 60 and trough 42.

One end of the pin 71 is connected to a bar 75 located at one side of the machine, this bar having its forward end bent, as at 76, so as to project between the ends of a pair of screws 77 and 79 carried by the forked upper end of a part of the main frame of the machine, as shown in Fig. 1. Adjustment of the forward screw 77 will, therefore, determine the extent of forward movement of the bar 75 and consequently of the toggle pin 71, thus determining the amount of bend of said toggle and the extent of withdrawal of the blocks 64 so as to govern the maximum vibration imparted to the trough, while contact of the bent end of the bar 75 with the rear screw 79 will limit the straightening of the toggle and thus determine the arrest of vibration or the minimum limit of vibration of the trough.

Proper adjustment of the screws 77 and 79 is indicated by graduated scales 77$^a$ and 79$^a$, which are preferably pivoted and engage with notches in the heads of the screws so as to lock them in adjusted position, either of the scales being swung up so as to free the notched head when it is desired to adjust either of the screws.

It is advisable to restrict the vibration of the trough just before the scale pan receives its proper weight of tacks from the feed trough, thereby reducing the volume of the stream falling from the trough into the scale pan so that the weight of this stream, at the time that the scale beam tips, and the further flow is cut off, will be materially less than it would be if the full stream was maintained up to the tipping point, greater accuracy in the individual weighings being thereby insured. In order to provide for this reduction in the extent of vibration of the feed trough at the proper time, I provide the bar 75 with a tooth 90 having a beveled face for contact with the correspondingly beveled face of a stud 91 secured to a disk 92, the latter having a spindle 93, which, as shown in Fig. 9, passes through the hub of a spur wheel 94, said hub turning in a bearing in a bracket 95 on the fixed frame and rotative movement being imparted to the spur wheel 94 by means of a pinion 96 secured to the main driving shaft 2, as shown in Fig. 7.

Between the adjoining faces of the disk 92 and spur wheel 94 is introduced a washer 97 of leather, felt, cork, or other friction material, which is held firmly between these faces by reason of the action of a coiled spring 99 upon the innermost of a pair of nuts 100 applied to the threaded outer end of the spindle 93 which carries the disk 92, consequently, while continuous rotative movement may be imparted to the spur wheel 94, the rotation of the disk 92 may be arrested whenever the resistance to such movement overcomes the frictional hold of the washer 97 upon the disk 92 or spur wheel 94. This resistance is afforded by contact of the forward end of the bar 75 with the set screw 79 after the bar has been moved rearwardly by contact of its tooth 90 with the stud 91 on the disk 92, and will continue as long as there is any obstacle to the rise of the rear end of the bar 75, under the lifting action of the beveled face of the stud 91 upon the beveled face of the tooth 90. In order that such obstacle may be provided until the scale pan has received its proper load the bar 75 has, at its rear end, a plate slotted to receive a roller upon an arm 101 which is secured to a rock shaft 102, any rocking motion of the latter such as would permit rise of the bar 75, being prevented by means hereinafter described, and under control of the scale pan or scale beam.

The trough 42 delivers the tacks into the scale pan 103 which is suspended upon the scale beam 104 as in the former machine, the weight pan 105, in the present instance, however, being suspended from the scale beam by means of side rods 106 carrying padded blocks 107, which, by contact with part of the fixed frame of the machine, limit the descent of the scale pan. The scale beam is provided with a compensating weight 109, which can be turned so as to adjust it back or forth upon a threaded stem 110 carried by the scale beam, said weight coöperating with a graduated scale 111.

In order to prevent the scattering of the tacks beyond the limits of the scale pan as they leave the delivery end of the trough 42, I mount, in advance of said trough, a cylindrical brush 112, having bristles of wire or other suitable brush material, this brush being mounted so as to be free to rotate in brackets 113 projecting from the trough 42. A yoke 114 embraces the forward portion of the trough, that portion of the yoke which extends over the top of the trough having a set screw 115 which carries a spring plate 116 bearing, at its opposite ends, upon the sides of the trough so as to resist any tendency of the latter to rise, by momentum, above its high point of vibration.

The cut-off valve 117 is, in the present machine, carried by a bar 139, which is pivotally mounted, by means of arms 140, directly upon the forward end of the feed trough 42, the bar normally resting upon but being free from connection with one arm of a lever 131, whose construction, operation and functions are hereinafter set forth. The yielding character of the bristles of the brush 112 prevents any interference with the upward or closing movement of the valve in the event of a tack or tacks being carried up by the valve during such closing movement.

When the scale pan receives its load the dropping of said scale pan, as the scale beam tips, sets in operation mechanism whereby the cut-off valve 117 is raised so as to stop the further flow of tacks into the scale pan, the dumping flap of the pan is unlocked, opened, reclosed and relocked, and the vibrations of the feed trough, which have before been reduced to lessen the size of the floating stream, are again restored to the predetermined maximum. The mechanism for accomplishing these results is illustrated principally in Figs. 3, 4 and 5. On reference to Fig. 5, it will be observed that the hub of the tappet wheel 21 has loosely mounted upon it a disk 120 between which and the adjoining face of the wheel 21 is interposed a friction washer 121, the disk 120 being driven by the wheel 21 through the medium of said interposed washer, and the rotation of said disk 120 can thereby be arrested, while the wheel 21 continues to rotate. Secured to the hub of the disk 120 is a cam 122 and between the face of the latter and the inner of a pair of adjustable nuts 123 on the threaded outer end of the hub of the wheel 21 is interposed a coiled spring 124 which serves to press the disk 120 toward the washer 121 and maintain proper frictional contact of the latter with the disk and wheel. The disk 120 has a projecting tooth 125 which is normally in engagement with a trigger 126, the latter being held in position to engage the tooth by means of a spring 127, as shown by dotted lines in Fig. 4. The long arm of the trigger is normally in the path of a pin which connects the arms 129 and 130 of a toggle, whose upper member is connected to a lever 131 and whose central pin is connected by a rod 132 to one arm of a bell crank lever 133, the other arm of said lever carrying a pivoted and spring-actuated toe 134 which, during the filling of the scale pan, is in contact with a lug 135 on an arm 136 pivoted at one end to the fixed frame of the machine and at the other end to the scale pan.

The lever 131 is acted upon by a spring 137 which tends to normally depress that arm of the lever which is connected to the upper toggle member 129 so as to tend to bend said toggle and cause it to trip the trigger 126 and permit rotation of the disk 120. Such bending movement, is, however, resisted by the lug 135 on the arm 136 acting through the medium of the lever 133 and rod 132. As soon, however, as the scale pan has received its load and the scale beam tips, the forward end of the arm 136 is depressed and moves the lug 135 out of the path of the spring-pressed tongue 134 on the lever 133, thus permitting the toggle 129—130 under the pressure of the rear arm of the lever 131 to bend and trip the trigger 126, while at the same time the forward arm of the lever 131 acts upon the bar 139 and raises the cut-off valve so as to arrest the further delivery of tacks from the trough 42. Owing to the fact that the normal position of the toggle members 129 and 130 is almost in line with one another, and to the leverage through which the restraining influence of the lug 135 is exerted to hold them in this position, the pressure of the lever 131 upon the toggle, causes such a very light pressure upon the lug 135 that it does not detract from the extreme accuracy of the weighing operations, the resistance of the lug 135 to the tipping of the scale beam, when the scale pan receives its load, being so slight as to be practically negligible. The disk 120 makes but one revolution, a projecting pin 141 on the disk, just before such revolution is completed, striking the rear end of the lever 131 and raising the same so as to again straighten the toggle 129—130, and permit the trigger 126 to resume its position for engagement with the tooth 125 of the disk when the latter has completed its full revolution, the pin 141 by this time having passed beyond the end of the lever 131 so as not to interfere with the depression of the same when the next weighing has been completed.

When the disk 120 is in its position of rest, the high portion of the cam 122 acts upon a roller 142 on an arm 143 pivoted to a lug on the fixed frame of the machine and acted upon by a spring 144 which tends constantly to move the lower end of the arm 143 forward, when such movement is permitted by the cam 122. The cam 122 is so formed that during one rotation of the same it will permit the lever 143 to be moved forward and will then again push the same rearward, to its position of rest. The lower end of the arm 143 is connected to a guided rod 145 whose front end is bent downward, as at 146, so as to act upon a pin 147 projecting from a lever 149 which is pivotally mounted upon a bracket on the movable flap 150 at the front of the scale pan, this flap being pivoted by a rod 151 to lugs on the fixed frame of the scale pan and being acted upon by a spring 152 which normally holds it in the closed position shown in Figs. 3 and 4. The lever 149 is acted upon by a spring 153 which tends to maintain it in the position shown in Figs. 3 and 4, so that a hooked arm 154 on the lever will engage a stud 155 projecting from the side of the scale pan and will thus lock the pivoted flap 150 of the scale pan in its closed position. As soon, however, as the rod 145 moves forward, it will trip the lever 149 so as to withdraw its hooked arm from engagement with the locking stud 155, further movement of the rod being then transmitted to the pivoted flap 150 of the scale pan so as to open the same and permit the pan to dump its load, the pan then rising by reason of the action of the weight upon the opposite end of the scale beam 104. All of these operations take place during less than a complete rotation of the disk 120, the final rise of the scale pan bringing the lug 135 on the arm 136 into position to engage the spring-actuated tongue on the lever 133 after said tongue has been moved rearwardly over the lug by the swing of the lever, due to the straightening of the toggle 129—130, when the rear arm of the lever 131 is lifted by contact with the pin 141 of the disk, this same movement withdrawing the support of the front arm of the lever from the bar 139 and permitting the cut-off valve to drop so as to resume the feed of tacks into the scale pan from the feed trough 42. The parts retain their normal positions until the scale pan has received another load, whereupon the operations above described are repeated.

When the arm 143 swings forward during the early portion of the rotative movement of the cam 122 it permits a like forward swinging movement of an arm 156 carried by the opposite end of the rock shaft 102 from that upon which the arm 101 is mounted, this forward swing of the arm 156 permitting the arm 101 to rise under the upward push of the bar 75 due to the action of the beveled stud 91 of the disk 92, upon the beveled tooth 90 on the bar, this disk 92 then resuming its rotation and the bar 75 being drawn forward until its bent front end contacts with the set screw 77, the toggle 70—72 being bent by the action of the spring 74 so as to retract the supporting blocks 64 and permit resumption of full vibration of the feed trough 42. These conditions continue until the disk 92 has completed a full revolution and the lug 91 again contacts with the tooth 90 of the bar 75, such bar having meantime been lowered so as to bring its tooth into range of the stud by reason of the action of the arm 143 on the arm 156 of the rock shaft 102, when said arm 143 was pushed back by the cam 122, as the latter approached the limit of its rotation.

At the bottom of the scale pan 103 and secured to the front side of the said scale pan, some distance above the bottom, are a series of spring fingers 160, as shown in Fig. 17, and if one or more tacks happens to remain in the scale pan when the swinging flap 150 closes, one or more of these fingers will yield and permit of the full closing of said flap and the locking of the same by the hooked arm 154 and stud 155, whereas, in the absence of such yielding fingers the presence of one or more tacks in the scale pan might be sufficient to prevent locking of the pivoted flap which would, therefore, open and permit of the escape of the tacks from the scale pan when the delivery of tacks to the latter was again resumed.

In order to prevent the depression of the fingers by the pressure thereupon of the mass of tacks in the scale pan, when the same is receiving its load, the upper portions of the fingers are covered by a guard plate 160$^a$ only the lower ends or tips of the fingers being exposed.

The scale pan delivers into a funnel 161 provided with a detachable nose 162, the funnel being suitably mounted on the fixed frame of the machine so that it can discharge into the successive packages presented for the reception of the tacks or can be reversed and discharge in a suitable receptacle while making test or experimental weighings. The packages for receiving the tacks rest upon a bar 163 whose outer end is bent downwardly and is threaded for engagement with a nut 164 confined vertically in a yoke 165 constituting part of a projecting member 166 of the fixed frame of the machine, whereby said bar 163 can be raised or lowered to adapt it to different heights of packages which may be employed.

The packages are confined laterally between side plates 167, the latter resting upon the yoke 165 and upon a bar 169 projecting laterally from the frame member 166 and said side plates are adjustable laterally from and toward each other in order to adapt them to packages of different widths, such adjustment being effected by means of a right and left hand screw 170 engaging nuts 171 carried by the side plates, the central portion of the screw stem being confined laterally to a bar 172 of the fixed frame as shown in Fig. 15.

In order that each filled package may be moved out of the way and a fresh empty package inserted in place of the same, I employ the mechanism shown in Figs. 1 and 2 and consisting of a slide 173 mounted so as to move freely back and forth on the bar 163, and having, at its forward end, a vertically adjustable pusher bar 174 which can be raised and lowered to suit the height of the package which is being filled. Reciprocating movement is imparted to the slide 173 by means of an arm 175 projecting upwardly from a treadle 176, which is suitably pivoted on the base of the machine and has a downwardly projecting stop pin 177, the latter, by contact with the base, limiting the depression of the treadle and the forward movement of the slide 173. Projecting backwardly from the treadle is a counterweight 179 having a threaded opening for the reception of a set screw 190 which, by contact with the base of the machine, limits the backward swing of the arm 175 and the backward movement of the slide 173, thus compensating for different lengths of package which are to be filled. By depressing the treadle 176 to its full extent and then turning the set screw 190 so as to lock it in that position, the arm 175 and slide 173 may be retained in their extreme forward position when it is desired to reverse the position of the funnel 161 for delivery into a properly placed receptacle while making test or experimental weighings.

It will be noted that whatever may be the extent of vibration of the feed trough 42 the bottom of said feed trough is always in contact with the contact head 62 of the vibrator lever 60, consequently the vibration of the feed trough is effected without any pounding or hammering action thereupon.

An important feature of my invention is that the reduction in the size of the stream before the scale pan receives its full load is independent of any partial tipping of the scale pan preliminary to the final tipping or final drop of such scale beam or pan, and as far as I am aware this is a novel feature of my invention.

Owing to the provision which my machine affords for accurately regulating the delivery of tacks from the delivery trough to the scale pan, the machine can be adjusted to produce any given number of weighings per minute, irrespective of the weight of the individual weighings, whether the latter are as heavy as a pound or as light as an ounce. If the machine is adapted to produce twelve weighings per minute the time available for each weighing is five seconds, from which must be deducted the time necessary to dump the loaded scale pan and restore the empty scale pan to position for receiving the next load. These latter operations are dependent upon the speed of rotation of the disk 120 while the reduction in the size of the stream is dependent upon the speed of rotation of the disk 92, hence by varying the relative speed of these two disks the size of the stream can be reduced as much or as little in advance of the completion of the weighing operation as the character of the tacks which are being weighed may suggest as appropriate for that particular class of tacks. As an instance it will be supposed that the disk 120 makes a complete revolution in one second and the disk 92 makes a complete revolution in three and three-quarter seconds and that the lug 91 of the disk 92 and tooth 90 of the bar 75 pass from contact with one another after the disk 120 has completed a quarter of a turn, or one quarter of a second after it begins its movement. As soon as the lug and tooth are free from engagement the feed trough 42 begins its full vibration but the cut-off valve 117 is not opened until three-quarters of a second later, or when the disk 120 has completed its full rotation. During the remaining three seconds of the period of rotation of the disk 92, therefore, the feed trough will deliver a full flow of tacks into the scale pan, but on the expiration of this period the extent of vibration of the feed trough and consequent size of the stream will be reduced, and during the remaining one second of the weighing period the stream will be light.

If the disk 120 required one and one-half seconds for a full rotation the time during which the size of the stream was reduced would be reduced to one-half second, and if the disk 120 required less than one second for its full rotation the time during which the size of the stream was reduced would be correspondingly increased.

If it is desired to vary the relative speed of rotation of the disks 92 and 120, this can be effected by changing the relative diameters of the spur gears 14 and 17, as will be clearly understood.

I claim:

1. In a tack weighing machine, the combination of a hopper, a segregating plate at the outlet thereof, and reciprocating devices for said plate having, as elements, an arm, a reciprocated rod passing therethrough, and a block on said rod for contacting with the arm, said block being adjustable to vary the amount of lost motion permitted.

2. The combination, in a tack weighing machine, of the feed hopper, the segregating plate, and means for reciprocating the same in front of the delivery mouth of the hopper, said segregating plate having inwardly curved hooks for engaging the mass of tacks.

3. The combination, in a tack weighing machine, of the feed hopper, a plate upon which the mass of tacks in the lower portion of the hopper bears and by which it is pushed outwardly, means for pressing the plate inwardly against the pressure of the mass of tacks, and a signaling device whose operation is dependent upon the movement of the plate.

4. The combination, in a tack weighing machine, of the feed hopper, a plate upon which the mass of tacks in the lower portion of the hopper bears and by which it is pushed outwardly, means for pressing the plate inwardly against the pressure of the mass of tacks, an electric signaling device, and connections whereby the inward and outward movement of the plate is caused to close and open the circuit through said device.

5. The combination, in a tack weighing machine, of a feed hopper, a pivoted and vibratable feed trough, and means for changing the relation of the pivot to the bottom of the trough, so as to increase or diminish the forward pitch in the vibration of the latter.

6. The combination, in a tack weighing machine, of a feed hopper, a vibratable feed trough, means for pivoting the latter at one end, and pivot carriers having a vertical series of openings whereby the vertical position of the pivot in respect to the trough can be changed.

7. The combination, in a tack weighing machine, of a feed hopper, a vibratable feed trough, and a plate whereby the tacks on entering the trough are caused to spread laterally over the bottom of the same.

8. The combination, in a tack weighing machine, of a feed hopper, a vibratable feed trough, and a plate whereby the tacks on entering the trough are caused to spread laterally over the bottom of the same, said plate having a downward pitch toward its forward end.

9. The combination, in a tack weighing machine, of a feed hopper, a vibratable feed trough, and a plate whereby the tacks, on entering the trough, are caused to spread laterally over the bottom of the same, said plate being adjustable to vary the distance between the same and the bottom of the trough.

10. The combination, in a tack weighing machine, of a feed hopper, a vibratable feed trough, means whereby a tack collecting reservoir is formed in the head portion of said trough, and means whereby a supplementary tack collecting reservoir is formed beyond the first in the direction of the delivery end of the trough.

11. The combination, in a tack weighing machine, of a feed hopper, a feed trough for receiving the tacks therefrom, adjustable side wings for contracting the flow of tacks through the trough, and a transverse screw engaging both of said wings whereby, on turning it in one direction said wings will be moved apart and on turning it in the opposite direction said wings will be moved toward each other.

12. The combination, in a tack weighing machine, of a feed hopper, a feed trough for receiving the tacks therefrom, adjustable side wings for contracting the flow of tacks through the trough, and a transverse screw engaging both of said wings whereby on turning it in one direction said wings will be moved apart and on turning it in the opposite direction said wings will be moved toward each other, the screw being carried wholly by the wings whereby it does not interfere with the tendency of the pair of wings to assume a central position in the trough.

13. The combination, in a tack weighing machine, of a feed hopper, a trough for receiving the tacks therefrom, a pair of side wings, a screw engaging the forward portions of said side wings and serving to move them from and toward each other, a recessed head on said screw, and a spring-actuated bolt carried by one of the wings and serving to lock said screw head in position after any adjustment.

14. The combination, in a tack weighing machine, of a feed hopper, a scale pan, a vibrating trough for receiving the tacks from the hopper and delivering them to the scale pan, and a valve coöperating with the delivery end of the trough for permitting or cutting off the flow of tacks therefrom into the scale pan.

15. The combination, in a tack weighing machine, of a feed hopper, a scale pan, a vibrating trough for receiving the tacks from the hopper and delivering them to the scale pan, and a valve coöperating with the delivery end of the trough for permitting or cutting off the flow of tacks therefrom into the scale pan, said valve being pivotally mounted upon the trough.

16. The combination, in a tack weighing machine, of a feed hopper, a scale pan, a vibrating trough for receiving the tacks from the hopper and delivering them to the scale pan, and a brush located at the delivery end of said trough to prevent scattering of the tacks.

17. The combination, in a tack weighing machine, of the feed hopper, the scale pan, a vibrating trough for receiving the tacks from the hopper and delivering them into the scale pan, a valve rising and falling at the end of said trough to prevent or permit delivery of the tacks from the trough, and a brush located at the end of the trough in such position that it will prevent scattering of the tacks and will oppose a yielding resistance to the lifting of the tacks by the rising cut-off valve.

18. The combination, in a tack weighing machine, of a feed trough for the tacks, a vibrated contact head, and means for maintaining the same constantly in contact with the trough.

19. The combination, in a tack weighing machine, of a feed trough for the tacks, a vibrated contact head, means for maintaining the same constantly in contact with the trough, and means for restricting the drop of the trough from its high position.

20. The combination, in a tack weighing machine, of the feed trough, a vibrated contact head, supporting plugs for the trough, and means for raising and lowering said plugs.

21. The combination, in a tack weighing machine, of the feed trough, a vibrated contact head, supporting plugs for the trough, means for raising and lowering the latter, and means for varying the extent of the rising and falling movement of said supporting plugs.

22. The combination, in a tack weighing machine, of the feed trough, a vibrated contact head for acting upon the bottom of the trough to cause vibration of the same, and yielding means for restricting movement of the trough due to momentum.

23. The combination, in a tack weighing machine, of a feed trough, a vibrated contact head for actuating the same, trough supports, toggle levers upon which said supports rest, means for bending and straightening said toggle to lower and raise the supports, and means for restricting the extent of such movements.

24. The combination, in a tack weighing machine, of a feed trough, a vibrated contact head for actuating the same, trough supports, toggle levers upon which said supports rest, means for bending and straightening said toggle to lower and raise the supports, and means for restricting the extent of such movements, said means being adjustable in order to vary the extent of movement of the toggle.

25. The combination, in a tack weighing machine, of a feed trough, a vibrated contact head for acting upon the same, and means for varying the extent of vibration of the trough, said means having, as elements, a controlling bar and a frictionally driven operating device therefor.

26. The combination, in a tack weighing machine, of a feed trough for the tacks, vibrating mechanism therefor, and means for varying the extent of the vibration imparted thereby to the trough, said means having, as elements, a controlling bar and a frictionally driven device which actuates said controlling bar to shorten the vibrations of the trough, and is then arrested by the controlling bar.

27. The combination, in a tack weighing machine, of a feed trough, means for vibrating the same, and means for varying the extent of such vibrating movement, said means comprising a controlling bar having a tooth thereon, a frictionally driven device having a stud for engaging said tooth, and means for moving the bar so as to carry its tooth into and out of position for engagement with the stud.

28. The combination, in a tack weighing machine, of a feed trough, means for vibrating the same, and means for varying the extent of such vibrating movement, said means comprising a control bar having a tooth thereon, a frictionally driven device having a stud for engaging said tooth, and means whereby the tipping of the scale beam on completion of the load is caused to permit movement of the controlling bar so as to carry its tooth out of engagement with the stud.

29. The combination, in a tack weighing machine, of a feed trough, means for vibrating the same, and means for varying the extent of such vibrating movement, said means comprising a controlling bar having a tooth thereon, a frictionally driven device having a stud for engaging said tooth, and means whereby, after the scale pan has discharged its load, the controlling bar is adjusted to bring its tooth into position for again engaging the stud.

30. The combination, in a tack weighing machine, of weighing mechanism including a scale pan, means for feeding the tacks into said pan, and means independent of the movement of the scale beam or pan for reducing the size of the stream passing from the trough to the scale pan.

31. The combination, in a tack weighing machine, of weighing mechanism, including a scale pan, a trough for feeding the tacks into said pan, means for vibrating said trough, and means independent of the movement of the scale beam or pan for lessening the extent of vibration of the feed trough.

32. The combination, in a tack weighing machine, of weighing devices including a scale pan, means for feeding the tacks into said pan, mechanism for regulating the size of the stream passing from the trough to the scale pan, mechanism set in operation by the tipping of the scale beam, and connections whereby the former mechanism is controlled by the latter to increase the size of the floating stream but is free from such control in operating to decrease the size of said stream.

33. The combination, in a tack weighing machine, of the feed trough, a scale pan for receiving the discharge therefrom, means for dumping the scale pan when it has received its load, means for vibrating the feed trough, means for governing the extent of such vibration, and means for operating, from a common shaft, said scale-pan-dumping devices, and said vibration regulating devices, the parts being so timed that the former will operate in less time than the latter.

34. The combination, in a tack weighing machine, of the feed trough, a scale pan for receiving the discharge therefrom, means for dumping the scale pan when it has received its load, means for vibrating the feed trough, means for governing the extent of such vibration, means for operating, from a common shaft, said scale-pan-dumping devices and said vibration regulating devices, the parts being so timed that the former will operate in less time than the latter, and means for varying such difference in the time of operation.

35. The combination, in a tack weighing machine, of a feed trough, a scale pan for receiving the discharge therefrom, means including a frictionally driven disk for dumping the scale pan when it has received its load, means including a frictionally driven disk for varying the extent of vibration of the feed trough, and means for driving the first of said disks at a higher rate of speed than the latter.

36. The combination, in a tack weighing machine, of a feed trough, a scale pan for receiving the discharge therefrom, means including a frictionally driven disk for dumping the scale pan when it has received its load, means including a frictionally driven disk for varying the extent of vibration of the feed trough, means for driving the first of said disks at a higher rate of speed than the latter, and means for varying such difference.

37. The combination, in a tack weighing machine, of the scale pan, a locking stud thereon, a pivoted dumping flap, and a lever carried thereby and having a hooked arm, which, as the dumping flap closes, is caused to swing into engagement with the locking stud on the scale pan.

38. The combination, in a tack weighing machine, of the scale pan, a pivoted dumping flap, locking means therefor, a series of spring plates which are located at the outlet of the scale pan and are free to yield to any obstruction which would prevent the closing of the dumping flap into locked position, and a guard plate overlapping said fingers throughout the greater portion of their length, but leaving their tips free.

39. The combination, in a tack weighing machine, of the scale beam and its scale pan, a frictionally driven disk, a trigger for locking the same, and means for tripping said trigger, said means including an arm rising and falling with the scale pan, a lug on said arm, and a lever connected to the tripping mechanism and engaging said lug when the scale pan is raised but disengaged from the lug when the scale pan drops.

40. The combination, in a tack weighing machine, of the scale beam and its scale pan, a frictionally driven disk, a trigger for locking the same, a pin on said disk, tripping mechanism for the trigger comprising an arm rising and falling with the scale pan and having a lug thereon, a lever connected to the tripping mechanism and engaging said lug when the scale pan is raised but free from engagement therewith when the scale pan drops, and resetting mechanism for the trigger-actuating device, said resetting mechanism comprising a lever acted upon by the projecting pin on the frictionally driven disk.

41. The combination, in a tack weighing machine, of the vibrating feed trough and the cut-off valve mounted thereon, a lever upon which said valve rests but which has no positive connection therewith, and means for actuating said lever so as to close the valve and permit the same to open.

42. The combination, in a tack weighing machine, of the scale beam and its scale pan, a frictionally driven disk, a trigger for locking the same, and tripping mechanism for said trigger having, as elements, an arm which rises and falls with the scale pan, a lug on said arm, and a lever connected to the tripping mechanism and having a spring-actuated toe for engaging said lug.

43. The combination, in a tack weighing machine, of a scale beam having a scale pan with movable dumping flap and locking lever thereon, a frictionally driven disk having a tooth and a pin thereon, a trigger for engaging said pin and locking said disk, a cam rotating with said disk, mechanism controlled by the movements of the scale pan for tripping said trigger, a resetting lever for said mechanism actuated by the pin on the disk, and unlocking and dumping devices for the scale pan flap actuated by the cam.

44. The combination, in a tack weighing machine, of a feed trough, a scale pan, vibrating mechanism for the feed trough, means for changing from short to long vibrations and vice versa, means for dumping the scale pan, a frictionally driven cam, and means whereby the latter is caused to effect dumping of the scale pan and at the same time to effect change from short to long vibrations of the feed trough.

45. The combination, in a tack weighing machine, of the feed trough, the scale pan, means for imparting vibration to said feed trough, means for changing from long to short vibrations and vice versa, said means including a frictionally driven disk and a governor bar engaging the same, means for dumping the scale pan, and a connection between said means and said governor bar whereby, when the scale pan is dumped, the governor bar will be moved out of engagement with its operating disk.

46. The combination, in a tack weighing machine, of the feed trough, a scale pan, means for imparting vibration to said feed trough, means for changing from long to short vibrations and vice versa, said means including a frictionally driven disk and a governor bar engaging the same, means for dumping the scale pan, and a connection between said means and said governor bar whereby, when the scale pan is dumped, the governor bar will be moved out of engagement with its operating disk, and when the parts are restored to normal position will be again moved into position to engage the same.

47. The combination, in a tack weighing machine, of a feed trough, a scale beam and its scale pan, a trough-vibrating device having, as an element, a tappet wheel, means for rotating the same, scale pan dumping mechanism, and an operating cam therefor having frictional connection with said tappet wheel.

48. The combination, in a tack weighing machine, of a scale beam and its scale pan, a feed trough, vibrating mechanism therefor having, as an element, a tappet wheel, means for rotating the latter, a valve for permitting or cutting off flow of tacks from the feed trough to the scale pan, and valve operating means having, as an element, a disk in frictional engagement with said tappet wheel.

49. The combination, in a tack weighing machine, of a scale beam, a scale pan thereon, a feed trough, vibrating mechanism therefor including a tappet wheel, a valve for permitting or preventing flow of tacks from the feed trough to the scale pan, valve-operating and scale pan dumping mechanism, and a frictionally driven disk for actuating the same, said disk being mounted upon the same shaft as the tappet wheel.

50. The combination, in a tack weighing machine, of the weighing mechanism and its scale pan, a funnel for directing the discharge from the scale pan into the package which is to receive it, means for mounting the funnel so that its position can be reversed, and a guide for said package comprising a supporting base bar and opposite side plates.

51. The combination, in a tack weighing machine, of the weighing mechanism and its scale pan, a funnel for directing the discharge from the scale pan into the package which is to receive it, and a guide for said package comprising a supporting base bar, opposite side plates, and means for raising and lowering said base bar.

52. The combination, in a tack weighing machine, of the weighing mechanism and its scale pan, a funnel for directing the discharge from the scale pan into the package which is to receive it, and a guide for said package comprising a supporting base bar, opposite side plates, means for raising and lowering said base bar, and means for moving the side plates from and toward each other.

53. The combination, in a tack weighing machine, of the weighing mechanism and its scale pan, a hopper for receiving the discharge from the scale pan and directing it to the package which is to receive it, a guide for said package, a pusher therefor, and reciprocating means for said pusher, said means comprising a treadle having a lever engaging the pusher, means for restricting movement of the treadle under pressure of the foot, and means for restoring the treadle to normal condition when the pressure of the foot is removed therefrom.

54. The combination, in a tack weighing machine, of the weighing mechanism and its scale pan, a hopper for receiving the discharge from the scale pan and directing it to the package which is to receive it, a guide for said package, a pusher therefor, and reciprocating means for said pusher, said means comprising a treadle having a lever engaging the pusher, means for restricting movement of the treadle under pressure of the foot, and means for restoring the treadle to normal condition when the pressure of the foot is removed therefrom, said means being susceptible of adjustment whereby the normal or raised position of the treadle can be varied.

In testimony whereof, I have signed my name to this specification, in the presence of two subscribing witnesses.

WM. O. TAYLOR.

Witnesses:
KATE A. BEADLE,
HAMILTON D. TURNER.